(12) United States Patent
Shinohara et al.

(10) Patent No.: US 6,959,003 B1
(45) Date of Patent: Oct. 25, 2005

(54) SERIAL TRANSMISSION PATH SWITCHING SYSTEM

(75) Inventors: Nobutaka Shinohara, Yokohama (JP); Tomoaki Sugiyama, Kawasaki (JP); Takashi Cho, Kunitachi (JP); Kazuhiko Ide, Yamato (JP); Yoshio Inagaki, Hino (JP); Sadao Tanikoshi, Hachioji (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/400,428

(22) Filed: Sep. 21, 1999

(30) Foreign Application Priority Data

| Sep. 22, 1998 | (JP) | ................................. 10-268418 |
| Nov. 10, 1998 | (JP) | ................................. 10-319569 |
| Nov. 10, 1998 | (JP) | ................................. 10-319571 |

(51) Int. Cl.[7] ............................................ H04L 12/56
(52) U.S. Cl. ...................................... 370/413; 370/428
(58) Field of Search ................................ 370/412–413, 370/415, 417, 386–388, 428

(56) References Cited

U.S. PATENT DOCUMENTS

| 3,894,177 A | | 7/1975 | Howell et al. |
| 3,970,798 A | * | 7/1976 | Epenoy et al. ............... 370/505 |
| 5,226,012 A | | 7/1993 | Amano et al. |
| 5,361,255 A | * | 11/1994 | Diaz et al. ................... 370/374 |
| 5,455,820 A | * | 10/1995 | Yamada |
| 5,740,468 A | * | 4/1998 | Hirose ......................... 395/877 |
| 5,754,254 A | | 5/1998 | Kobayashi et al. |
| 5,757,805 A | | 5/1998 | Lee |
| 5,768,257 A | * | 6/1998 | Khacherian et al. ......... 370/229 |
| 5,790,522 A | * | 8/1998 | Fichou et al. ................ 370/236 |
| 6,359,883 B1 | * | 3/2002 | Lechleider ................... 370/389 |
| 6,532,234 B1 | * | 3/2003 | Yoshikawa et al. ......... 370/395 |
| 6,643,294 B1 | * | 11/2003 | Cooperman et al. ........ 370/413 |

FOREIGN PATENT DOCUMENTS

| JP | 50-17163 | 2/1975 |
| JP | 62-70706 | 6/1977 |
| JP | 55-5599 | 1/1980 |
| JP | 61-146015 | 7/1986 |
| JP | 62-123889 | 6/1987 |

(Continued)

OTHER PUBLICATIONS

M. S. Tooms, IBA Technical Review, XP-000795020, No. 16, pp. 26-42, "Systems Engineering Considerations in the All Digital Television Production and Transmission Centre", Mar. 1982.

Primary Examiner—Kenneth Vanderpuye
(74) Attorney, Agent, or Firm—Oblon, Spivak, McClelland, Maier & Neustadt, P.C.

(57) ABSTRACT

A serial transmission path switching system includes a matrix switch section for switching N×M lines at a fixed rate. An optical receiving section is connected to receive an optical signal from an optical transmission path, photoelectrically convert it, and supply it to the matrix switch section. An optical transmitting section is connected to convert an output from the matrix switch section into an optical signal and send it to an optical transmission path. An input buffer is connected to the terminal of the optical transmission path connected to the optical receiving section to equalize the input signal from an input-side communication device, convert the signal into an optical signal, and send it to the optical transmission path. An output buffer is connected to the terminal of the optical transmission path connected to the optical transmitting section to convert an optical signal from the optical transmitting section into an electrical signal, equalize it, and output it to an output-side communication device.

21 Claims, 7 Drawing Sheets

FOREIGN PATENT DOCUMENTS

| JP | 62-237893 | 10/1987 |
|----|-----------|---------|
| JP | 2-164123  | 6/1990  |
| JP | 3-18198   | 1/1991  |
| JP | 4-160949  | 6/1992  |
| JP | 4-286498  | 10/1992 |
| JP | 5-63734   | 3/1993  |
| JP | 5-308686  | 11/1993 |

* cited by examiner

SERIAL TRANSMISSION PATH SWITCHING SYSTEM

BACKGROUND OF THE INVENTION

The present invention relates to a serial transmission path switching system for selectively switching and connecting communication devices having a plurality of transfer rates.

Along with the recent advance in the digital technology, digitalization of HDTV signals is realized as well as that of conventional standard TV signals. Digitalization of video signals is also prompting development of video compression techniques such as MPEG or JPEG. For example, a broadcasting station uses video signals with various transfer rates. Examples of the video signals with different transfer rates are an HDTV baseband signal (1.5 Gbps), a standard TV signal (143 Mbps, 177 Mbps, 270 Mbps, 360 Mbps, 540 Mbps, or the like), and a compressed video signal (MPEG, JPEG, or the like). In this specification, a "video signal" means a signal containing not only image information but also an audio component and sync signals.

In this case, a serial transmission path switching apparatus for concentrating a plurality of serial transmission paths with a plurality of transfer rates to one portion and selectively switching and connecting one of the serial transmission paths is used. This switching apparatus has, in the input and output sections, interface sections (equalizing sections using buffers) corresponding to the various transfer rates. The apparatus demodulates the waveform degradation of an input signal in the input section and switches the signal (signal switching). The waveform degradation in the signal selected by the switch section is demodulated by the output section and output to the output transmission path.

However, in such a conventional serial transmission path switching apparatus, the maximum number of channels for each transfer rate is predetermined, resulting in poor expandability. For example, this apparatus cannot flexibly cope with addition of serial transmission paths due to an increase in number of studios or equipment or addition of a serial transmission path with a new transfer rate.

More specifically, since the maximum number of lines for each transfer rate is predetermined, serial transmission paths with new transfer rates cannot be connected beyond the number of free lines of the matrix switch section. To solve this, the design of the interface configurations of the input and output sections must be changed, resulting in a large increase in cost.

Besides, in the conventional matrix switch section, a jitter is generated in the output signal due to a variation in delay in a processing circuit, and some influence of the band width of a passing frequency. To reduce this jitter and facilitate signal reconstruction at the receiving section, the matrix switch section has a re-timing section including a clock signal extraction circuit and a D-flip-flop (D-FF) circuit for each switch. The clock signal extraction circuit can cope with only a signal with a fixed transfer rate. To process signals having different transfer rates (multi-rate), switches dedicated for the respective signals must be provided.

In addition, conventionally, when a large-scale matrix switch section is to be formed to process both a low- and high-speed digital signals, the numbers of switches, distributors, and selectors or the circuit scale increases to result in an increase in the apparatus scale or power consumption.

BRIEF SUMMARY OF THE INVENTION

It is an object of the present invention to provide a serial transmission path switching system capable of flexibly coping with addition or change in a communication device having an existing transfer rate or addition of a communication device having a new transfer rate.

It is another object of the present invention to provide a compact and reliable serial transmission path switching system with low power consumption which can decrease the number of switches in a large matrix switch section and also reduce the circuit scales of a distributor and selector.

According to the first aspect of the present invention, there is provided a serial transmission path switching system comprising:

a switch section having a plurality of input lines and a plurality of output lines to perform line-switching between the input lines and output lines;

a plurality of first serial transmission paths connected to the input lines, respectively;

input buffers connected to input-side communication devices and terminals of the first serial transmission paths, respectively, to equalize transmission signals from the input-side communication devices and send the signals to the first serial transmission paths;

a plurality of second serial transmission paths connected to the output lines, respectively; and output buffers connected to output-side communication devices and terminals of the second serial transmission paths, respectively, to equalize transmission signals from the second serial transmission paths and send the signals to the output-side communication devices.

A receiving section may be inserted between the first serial transmission paths and the input lines to receive the transmission signals from the first serial transmission paths and supply the signals to the input lines. A transmitting section may be inserted between the output lines and the second serial transmission paths to receive the transmission signals from the output lines and supply the signals to the second serial transmission paths.

According to the second aspect of the present invention, in the system of the first aspect, the switch section comprises a switch having a plurality of input portions and a plurality of output portions to perform line-switching between the input portions and output portions, frequency band expanding members connected to the output portions, respectively, to increase a gain of high-frequency-side frequency characteristics of each of transmission signals from the output portions, and buffer amplifiers connected to the frequency band expanding members to buffer the transmission signals from the frequency band expanding members and send the signals to the output lines, respectively.

According to the third aspect of the present invention, in the system of the first aspect, the switch section comprises a switch having a plurality of input portions and a plurality of output portions to perform line-switching between the input portions and output portions, conversion members connected to the output portions to convert transmission signals from the output portions into pairs of positive and negative differential signals, respectively, pairs of frequency band expanding members connected to the conversion members, respectively, to increase a gain of high-frequency-side frequency characteristics of each of the positive and negative differential signals from the conversion members, and buffer amplifiers connected to the pairs of frequency band expanding members to combine the transmission signals from the pairs of frequency band expanding members into single signals, buffer the single signals and send the signals to the output lines, respectively.

According to the fourth aspect of the present invention, in the system of the first aspect, (a) the receiving section has Li (Li is a natural number) distributors for distributing digital signals of Li channels to a first group and a second group in units of a channel, (b) the switch section comprises an input stage formed by parallelly arranging a plurality of switches and having a total of at least 2Li (Li is a natural number) inputs, each switch having a maximum number N (N is a natural number) of inputs and a maximum number M (M is a natural number) of outputs, an output stage formed by parallelly arranging a plurality of switches and having a total of at least 2Lo (Lo is a natural number) outputs, each switch having the maximum number N of inputs and the maximum number M of outputs, and a middle stage inserted between the input stage and the output stage and formed by parallelly arranging (P+Q) (where P (P is a natural number) is the number of inputs of one switch of the input stage for one of the groups, and Q (Q is a natural number) is the number of outputs of one switch of the output stage for one of the groups) switches having inputs equal in number to the total number of outputs of the switches of the input stage and outputs equal in number to the total number of inputs of the switches of the output stage, wherein the digital signals of the first and second groups of each of the Li channels, which are distributed by the receiving section, are input to switches of the input stage different from each other between the groups, passed through the plurality of switches of the middle stage, and output from switches of the output stage different form each other between the groups, and (c) the transmitting section has Lo selectors such that the digital signals of the first and second groups, which are output from switches of the switch section different from each other between the groups, are input to corresponding selectors, and the digital signal of one of the groups is selectively output.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
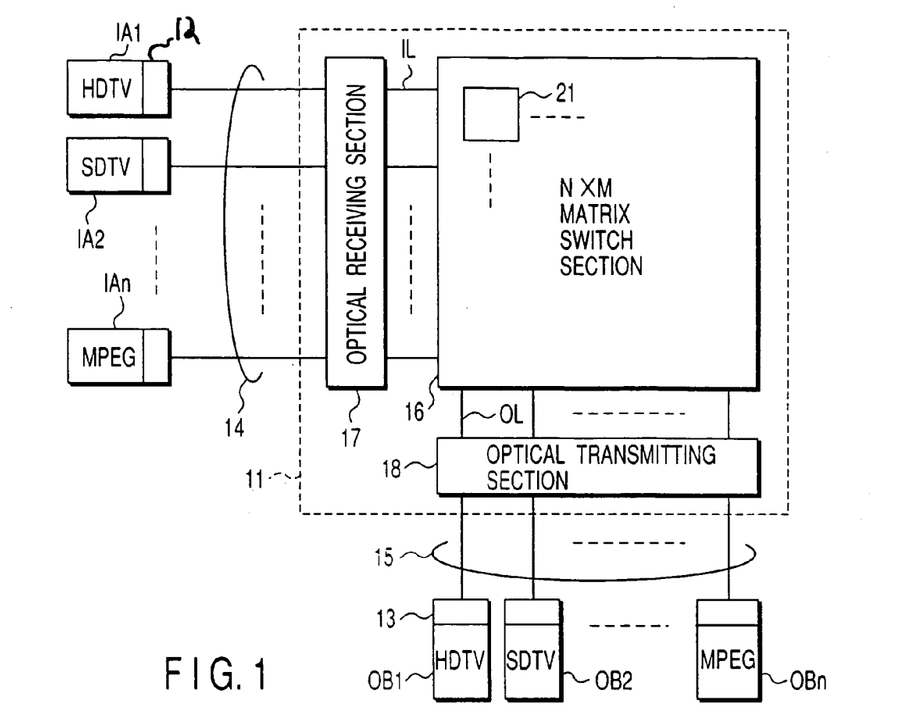
FIG. 1 is a block diagram showing a serial transmission path switching system according to the first embodiment of the present invention.

FIG. 1 is a block diagram showing a serial transmission path switching system according to the first embodiment of the present invention. This system includes a switching apparatus 11 having a matrix switch section 16 for switching between N input lines IL and M output lines OL at predetermined fixed rates. The matrix switch section 16 normally has a number of switches 21, e.g., 16×16 switches or 32×32 switches, arranged in a matrix format. In the present invention, the matrix switch section also includes a matrix switch section having only one switch 21.

In the switching apparatus 11, an optical receiving section 17 is arranged to receive optical signals from N transmission paths at maximum, convert them into electrical signals, and supply the signals to corresponding input lines of the matrix switch section 16. In the switching apparatus 11, an optical transmitting section 18 is also arranged to convert electrical signals, from output lines of the matrix switch section 16, into optical signals, and send the signals to corresponding ones of the M optical transmission paths at maximum. To connect the matrix switch section 16 to the optical receiving section 17 and optical transmitting section 18, wideband coaxial cables (about 1 to 2 m) are used.

This system uses, as serial transmission paths 14 and 15, optical transmission paths (about 2 km at maximum) using optical fibers. The terminal of each optical transmission path 14 on the input side has an input buffer 12 which is connected to an input-side communication device IA (IA1 to IAn) to equalize (demodulate) the transmission signal from the input-side communication device, convert the signal from an electrical signal to an optical signal, and then send the optical signal to the transmission path 14. The terminal of each optical transmission path 15 on the input side has an output buffer 13 which is connected to an output-side communication device OB (OB1 to OBm) to convert the transmission signal from the transmission path 15 from an optical signal to an electrical signal, equalize (demodulate) the signal, and then send the signal to the output-side communication device.

Figure 2A:
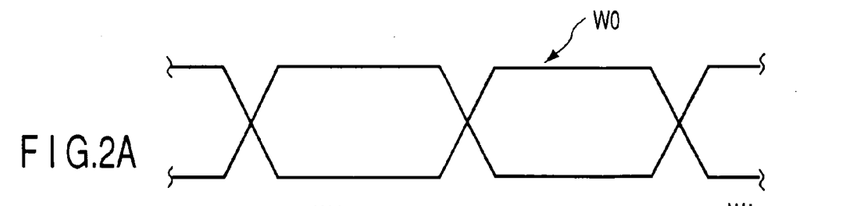
FIGS. 2A to 2D are views for explaining equalization of a transmission signal.
Figures 2B, 2C, 2D:
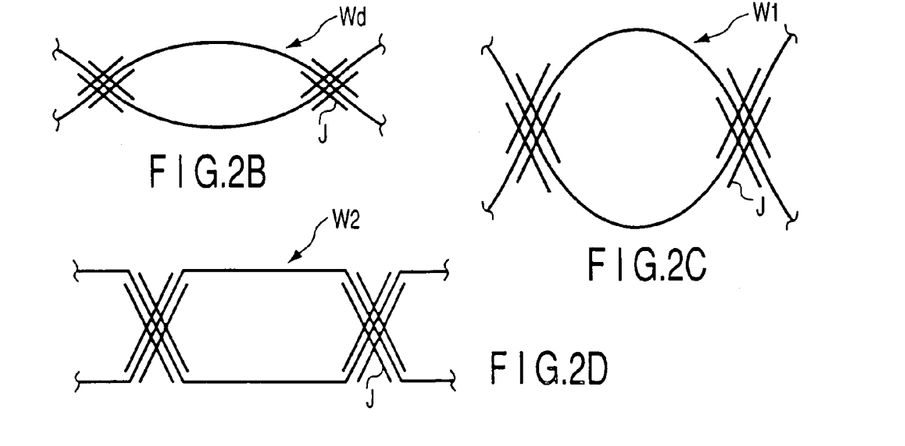

The input buffer 12 and output buffer 13, which convert an electrical signal to an optical signal and vice versa, have an equalizing function. Equalization means processing of repairing a degraded waveform. More specifically, a signal waveform W0 having an ideal shape as shown in FIG. 2A degrades during transmission and becomes a reduced waveform Wd containing a jitter component J as shown in FIG. 2B. Equalization is performed to return the degraded waveform Wd to the original waveform W0.

More specifically, in this embodiment, equalization includes three processing operations: re-shaping, re-generation, and re-clock. In re-shaping, the waveform Wd is amplified to the same intensity as that of the original waveform W0 to obtain a waveform W1 as shown in FIG. 2C. Next, in re-generation, the waveform W1 is subjected to binarization to obtain a waveform W2 as shown in FIG. 2D. In re-clock, the jitter component J is removed from the waveform W2 to obtain the original waveform W0 shown in FIG. 2A. Re-clock is performed by extracting a stable clock from an object signal by means of filtering or the like, and latching, in response to the clock, the D-flip-flop circuit for outputting a processed signal to remove the jitter component of the signal. The jitter component J can also be removed by filtering a frequency of the object signal.

The operation of the arrangement shown in FIG. 1, which is applied to the transmission system in a broadcasting station, will be described.

The switching apparatus 11 is installed in an appropriate switching control room. Serial transmission paths are constructed using optical cables from the switching control room to HDTV (High Definition TV) studios, SDTV (Standard Definition TV) studios, MPEG editorial room, DVC (Digital Video Camcoder) editorial room, and the like. The terminals of the optical cables are connected to the input buffers 12 and output buffers 13 corresponding to the transfer rates of connected devices necessary in each room.

For example, in an SDTV studio, an SDTV camera output is connected to the input buffer 12 compatible with SDTV. This input buffer 12 equalizes a signal in accordance with the camera output signal rate, converts the signal into an optical signal, and sends the signal to the switching apparatus 11 via the serial transmission path of an optical fiber. The switching apparatus 11 receives the optical signal from the SDTV studio at the optical receiving section 17, converts the optical signal into an electrical signal, and inputs the signal to the matrix switch section 16.

Conventionally, a matrix switch cannot be commonly used to supply an SDTV signal to an SDTV system, an HDTV signal to an HDTV system, and an MPEG signal to an MPEG system. According to the present invention, one matrix switch can be commonly used for signals having different transfer rates (formats).

Conventionally, when the SDTV studio is to be changed (updated) to an HDTV studio in the above environment, the switching apparatus itself must be modified. In this embodiment, only the input buffer 12 or output buffer 13 connected to the terminal of the serial transmission path need be exchanged with a buffer compatible with HDTV. The switching apparatus main body need not be altered.

The input/output lines of the switching apparatus are parallel under the same conditions. All input/output signals have the same transfer rate. For this reason, as long as free lines are present, this system can easily cope with an increase in the number of connected devices. Even when a communication device requiring a new transfer rate appears, only an input buffer or output buffer compatible with the transfer rate need be prepared and replaced.

Figure 3:
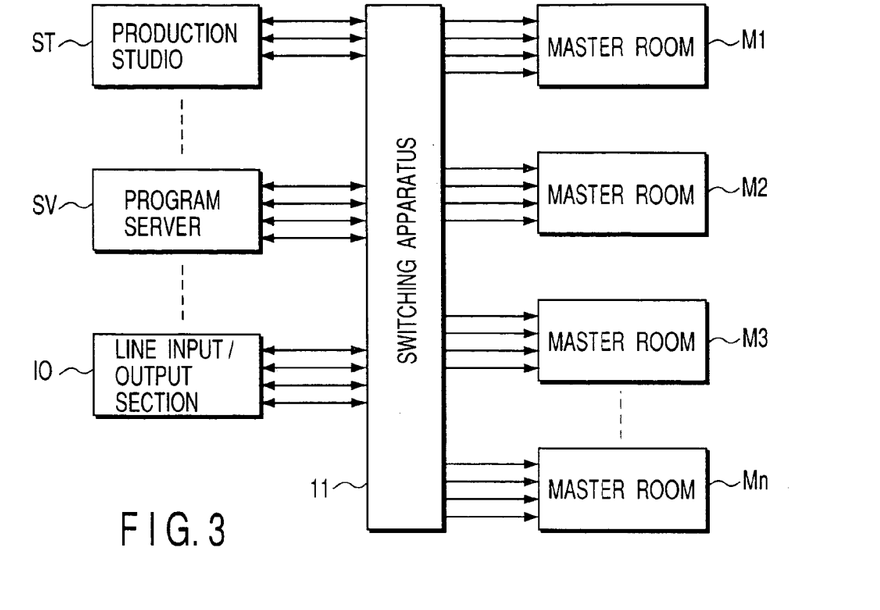
FIG. 3 is a view showing an arrangement in which the serial transmission path switching system shown in FIG. 1 is applied to a video distribution system in, e.g., a broadcasting station.

FIG. 3 is a view showing an arrangement in which the serial transmission path switching system shown in FIG. 1 is applied to a video distribution system in, e.g., a broadcasting station. The switching apparatus 11 switches the video signal transmission route between a production studio ST, program server SV, line input/output section IO, and master rooms M1 to Mn to allow free distribution of the video signal. The input buffers 12 shown in FIG. 1 are arranged in the production studio ST, program server SV, and line input/output section IO shown in FIG. 3. The output buffers 13 shown in FIG. 1 are arranged in the master rooms M1 to Mn shown in FIG. 3.

The serial transmission path switching system shown in FIG. 1 uses optical cables for all serial transmission paths. For a short distance, a wideband coaxial cable may be used. In this case, for a corresponding input/output line of the matrix switch section 16, electrical signal receiving and transmitting units are used in place of the optical receiving section and optical transmitting section. Also in this case, when receiving and transmitting functions are imparted to the matrix switch section 16, the receiving and transmitting sections can be omitted, and the serial transmission paths 14 and 15 can be directly connected to the input lines IL and output lines OL of the matrix switch section 16.

It is versatile and convenient to make the input buffer 12 and output buffer 13 correspond to a plurality of transfer rates and allow to selectively set a transfer rate in accordance with a connected communication device.

As described above, according to the serial transmission path switching system shown in FIG. 1, a serial transmission path switching system capable of flexibly coping with addition or change in a communication device having an existing transfer rate or addition of a communication device having a new transfer rate can be provided.

Figure 4:
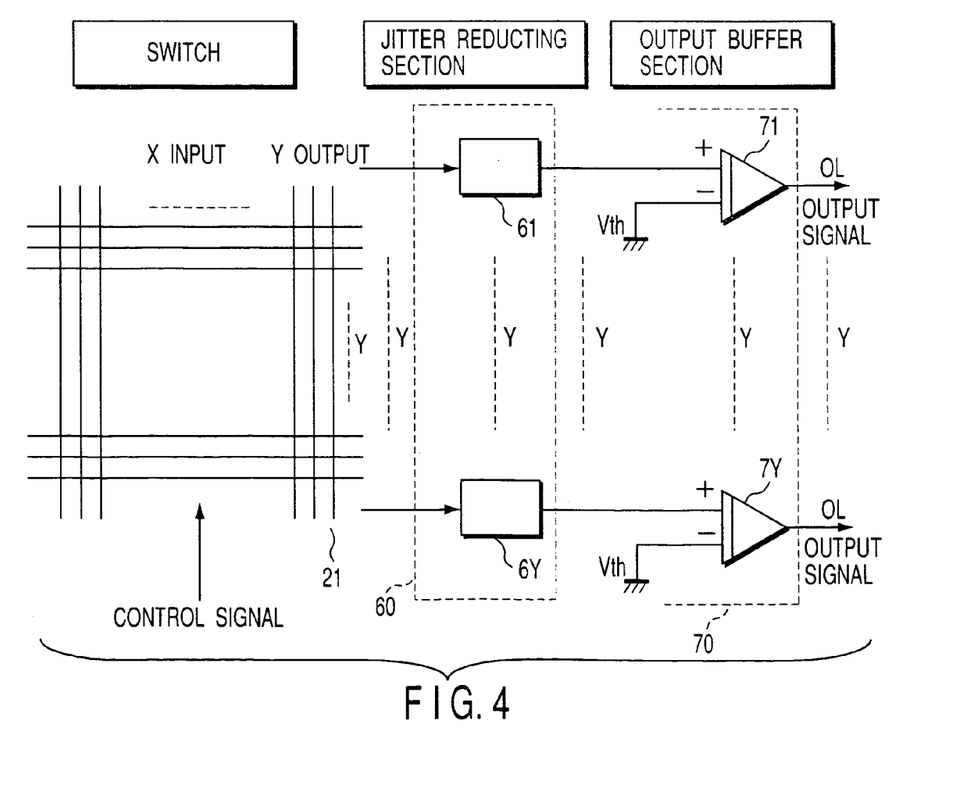
FIG. 4 is a view showing the arrangement of a switch circuit according to another embodiment of the present invention.

FIG. 4 is a view showing the arrangement of a switch circuit according to another embodiment of the present invention. The switch circuit shown in FIG. 4 is associated with each switch 21 of the 16×16 switches or 32×32 switches in a matrix switch section 16 shown in FIG. 1.

The switch circuit shown in FIG. 4 inputs Y signals from the switch 21 to a jitter reducing section 60 and extracts signals output from the jitter reducing section 60 via an output buffer section 70 as output signals. The jitter reducing section 60 has jitter reducing circuits 61 to 6Y. The Y input signals (single) are input to the jitter reducing circuits 61 to 6Y, respectively. The signals from the jitter reducing circuits 61 to 6Y are input to buffer amplifiers 71 to 7Y in the output buffer section 70, respectively and externally extracted via output lines OL (FIG. 1) as output signals.

Figure 8:
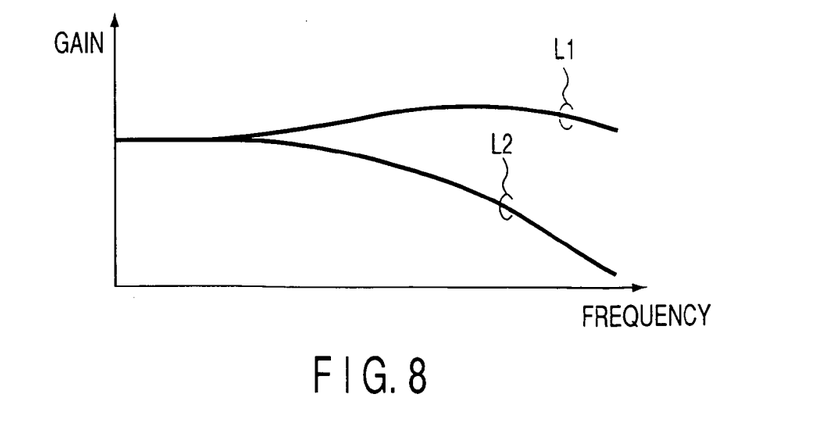
FIG. 8 is a graph showing a state wherein the frequency characteristics change due to the jitter reducing circuit.

Each of the jitter reducing circuits 61 to 6Y in the switch circuit shown in FIG. 4 is constructed as a high-pass filter in which a resister R and a capacitor C are connected in parallel. With this arrangement, the jitter reducing circuits 61 to 6Y subject the signals from the switch 21 to peaking on the high-frequency side of the frequency characteristics. More specifically, as shown in FIG. 8, when the jitter reducing circuits 61 to 6Y are used, the gain in a high-frequency range can be increased. Referring to FIG. 8, a line L represents a characteristic in use of the jitter reducing circuits 61 to 6Y, and a line L2 represents a characteristic in the absence of the jitter reducing circuits.

With this arrangement, the high-frequency characteristics can be improved, and the jitter component contained in each signal can be suppressed. In addition, jitter reduction can be realized independently of a clock signal. Hence, the jitter in multi-rate signals can be suppressed independently of the bit rates of input signals.

According to the switch circuit shown in FIG. 4, the signals from the switch 21 are input to the output buffer section 70 via the jitter reducing circuits 61 to 6Y of the jitter reducing section 60 and extracted as output signals. Each of the jitter reducing circuits 61 to 6Y is formed as the parallel circuit of the resister R and capacitor C. With this arrangement, waveform shaping (jitter reduction) of the signals can be performed without using any clock signal. As a result, a single switch circuit capable of processing multi-rate signals can be provided.

When the switch circuit can cope with multi-rate signals, connection terminals can be freely selected in updating the existing facilities. In a conventional apparatus of this type known as a multi-rate compatible apparatus, signals of various rates can be input, though the terminals for outputting the signals are permanently set. More specifically, out of a plurality of input/output terminals, a terminal A is dedicated for, e.g., NTSC, and a terminal B is dedicated for, e.g., HDTV. However, the present invention can improve this point and is advantageous because the input/output terminals (not shown) usable for the respective bit rates are not limited.

A bias voltage Vth or a certain threshold value is supplied to one input terminal of each of the buffer amplifiers 71 to 7Y. This is because a single signal is processed and readily causes a variation in operating point on the receiving side. For this reason, the operating point in each channel must be stabilized using, e.g., a rheostat (not shown). An example for eliminating its necessity will be described in the following embodiment.

Figure 6:
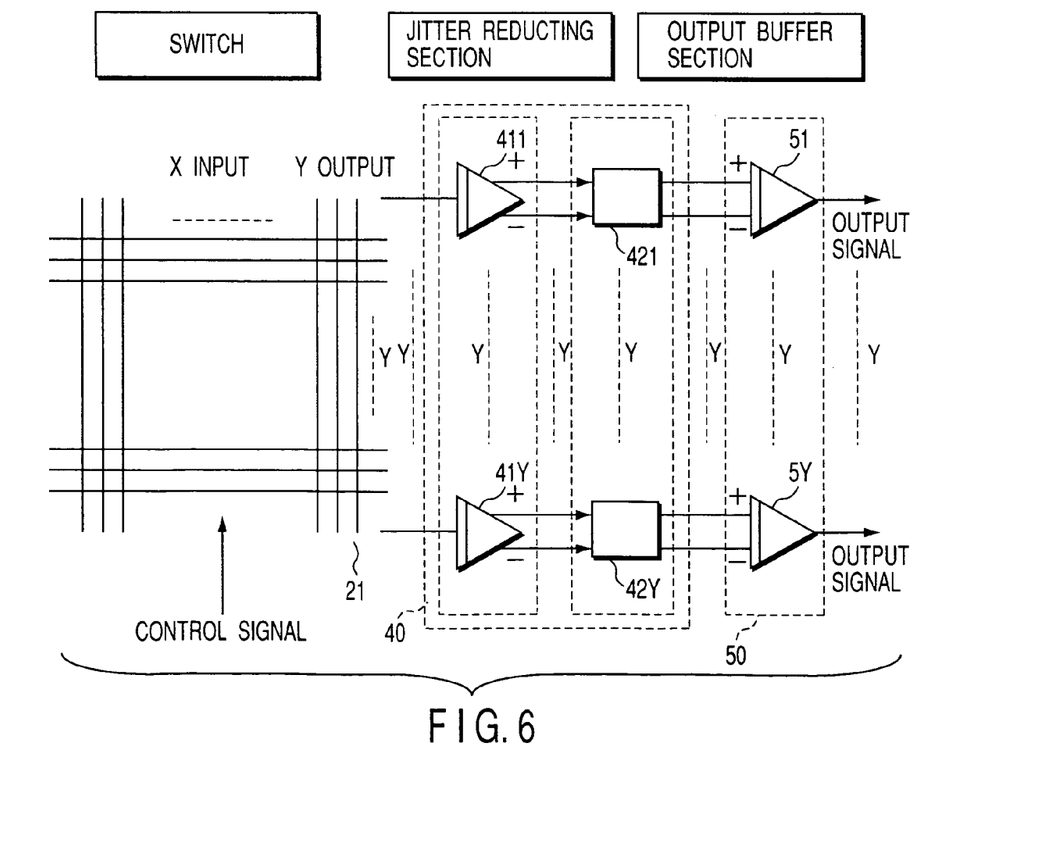
FIG. 6 is a view showing the arrangement of a switch circuit according to still another embodiment of the present invention.

FIG. 6 is a view showing the arrangement of a switch circuit according to still another embodiment of the present invention. The switch circuit shown in FIG. 6 inputs output signals from switch 21 to a jitter reducing section 40 and extracts the differential signals output from the jitter reducing section 40 via an output buffer section 50 as output signals. In the jitter reducing section 40, Y input signals (single) are input to differential signal generating circuits 411 to 41Y, respectively, and converted into differential signals. The differential signals are input to jitter reducing circuits 421 to 42Y, respectively. The signals from the jitter reducing circuits 421 to 42Y are input to buffer amplifiers 51 to 5Y of the output buffer section 50, respectively, and externally extracted via output lines OL as output signals.

Figure 5A:
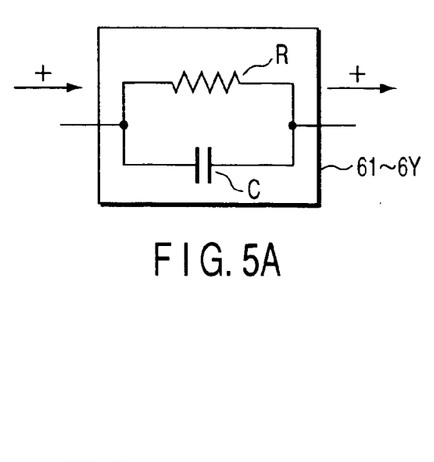
FIGS. 5A and 5B are views showing examples of a jitter reducing circuit in the arrangements shown in FIGS. 4 and 6, respectively.
Figure 5B:
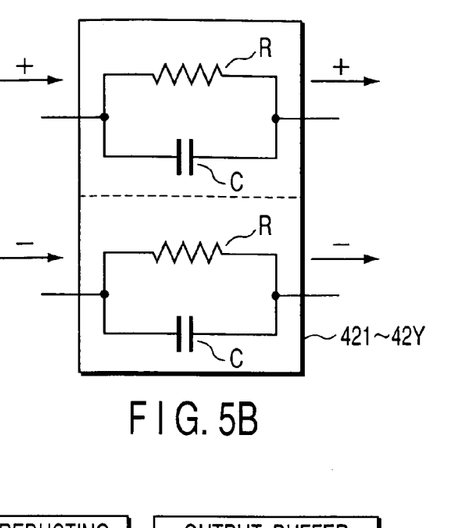

As shown in FIG. 5B, the jitter reducing circuits 421 to 42Y of the switch circuit shown in FIG. 6 are formed by arranging the jitter reducing circuits 61 to 6Y shown in FIG. 5A for each of the positive and negative differential signals. With this arrangement, both the positive and negative differential signals from the switch 21 are subjected to peaking by the jitter reducing circuits 421 to 42Y on the high-frequency side of the frequency characteristics. The high-frequency characteristics can be improved, and the jitter component contained in each signal can be suppressed. Like the switch circuit shown in FIG. 4, the jitter in multi-rate signals can be suppressed independently of the bit rates of input signals.

In the switch circuit shown in FIG. 6, after the jitter is reduced in each of the differential signals, the signals are converted into a single signal by the output buffer section 50 and output. For this reason, the operating point on the receiving side can be always kept stabilized.

In the switch circuit shown in FIG. 4, since the jitter is reduced in the single signal, the operating point readily varies. For this reason, the operating point in each channel must be adjusted using, e.g., a rheostat. An increase in the number of channels makes this adjustment cumbersome. The switch circuit shown in FIG. 6 can improve this point and can omit operating point adjustment. Hence, a more convenient switch circuit can be provided. In addition, in-phase noise can also be reduced.

Figure 7:
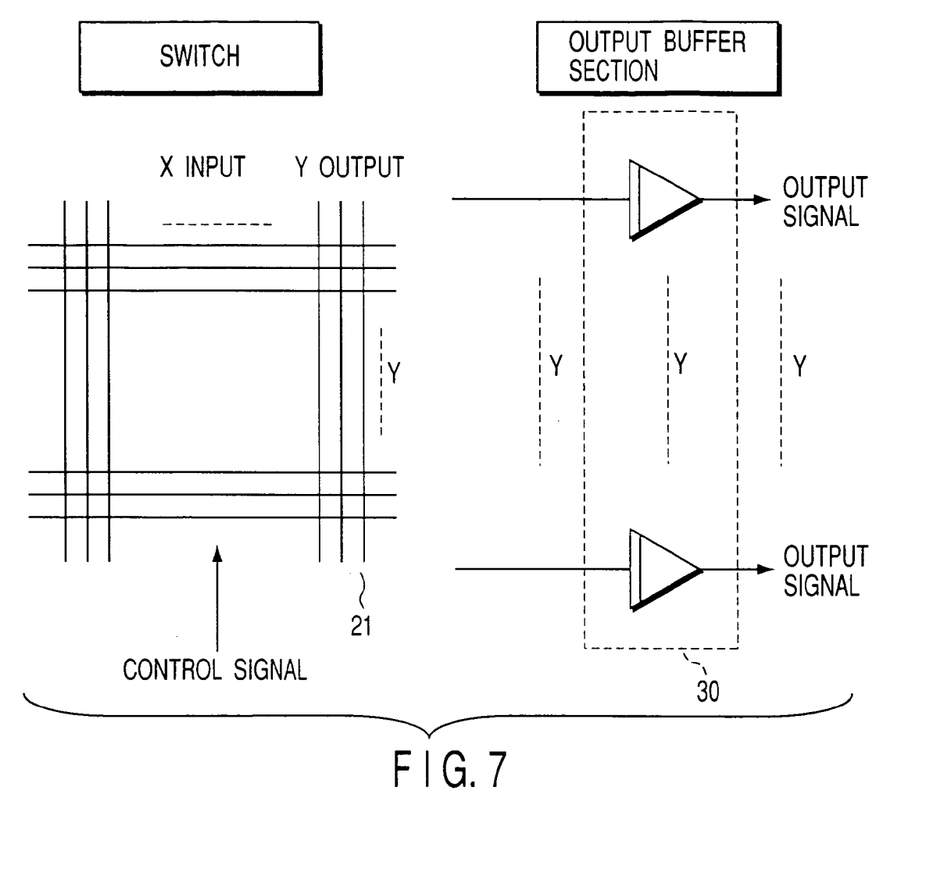
FIG. 7 is a view showing the arrangement of a switch circuit according to still another embodiment of the present invention.

FIG. 7 is a view showing the arrangement of a switch circuit according to still another embodiment of the present invention. The switch circuit shown in FIG. 7 directly externally outputs output signals from switch 21 via an output buffer section 30. That is, the section for reducing the jitter is omitted.

The switch circuit shown in FIG. 7 assumes processing of signals having relatively low bit rates. Video signals include various signals: SDTV, HDTV, MPEG, and IEEE 1394 interface signals. These signals have various bit rates. An SDTV signal has a bit rate of 170 to 270 Mbps, an HDTV signal has a bit rate of 1.485 Gbps, an MPEG signal has a bit rate of several (2 to 4) Mbps, and an IEEE 1394 interface signal has a bit rate of 100 Mbps to 3.2 Gbps.

An HDTV signal will be compared with an MPEG signal. The HDTV signal has a bit rate on the order of about 1,000 times that of the MPEG signal. When a matrix switch dedicated to an HDTV signal is used for an MPEG signal or a signal having a similar bit rate, the jitter poses no problem.

That is, when the operation speed of the switching element of each switch 21 is increased to about 1,000 times the bit rate of a signal to be processed, the margin for data identification increases, so data can be reliably identified independently of whether a jitter is present.

Figure 9A:
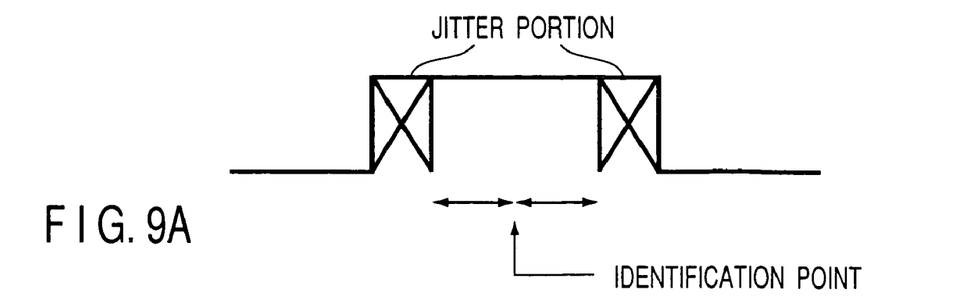
FIGS. 9A and 9B are views showing states wherein the margin for data identification changes in the relationship between a signal bit rate and the operating speed of a switch.
Figure 9B:
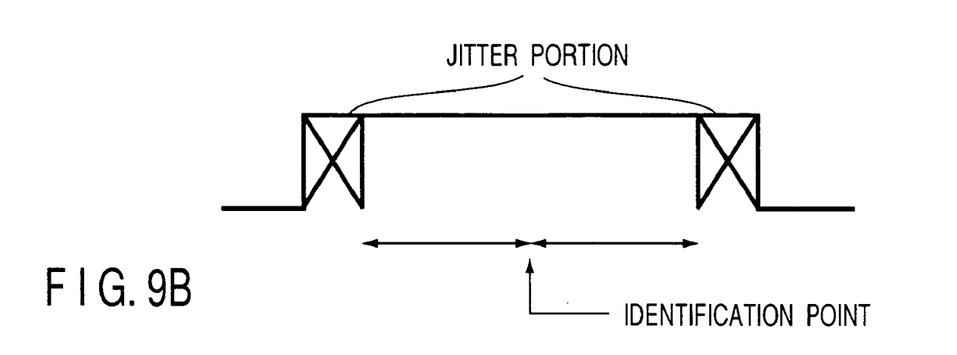

This will be described with reference to FIGS. 9A and 9B. FIG. 9A shows a case wherein the operation speed of the switch 21 is relatively close to the signal bit rate. In this case, the margin for data identification is small. To prevent a bit error in signal reconstruction, the jitter must be reduced. FIG. 9B shows a case wherein the operation speed of the switch 21 is higher than the signal bit rate. In this case, the margin for data identification is large, and no bit error occurs even when the identification point shifts. Hence, data can be reliably identified without reducing the jitter.

In the switch circuit shown in FIG. 7, only when the operation speed of the switch 21 is higher (about 1,000 times or more) than the bit rate of a signal to be processed, the jitter reduction section is omitted. With this arrangement, the video distribution system can be simplified, and various advantages including cost reduction can be obtained.

As is known, it is sufficient for practical use when the operation speed of the switch 21 is about 100 times the bit rate of a signal to be processed. For example, when the operation speed of the switch 21 is 1 Gbps for a signal having a bit rate of 2 Mbps, no problem for practical use is posed (in this case, the ratio between the operation speed and bit rate is 500). The operation speed of the switch 21 can be as high as possible with respect to the bit rate of the signal to be processed. This is because the number of types of signals that can be processed further increases. In the switch circuit shown in FIG. 7, the operation speed of the switch 21 is about 1,000 times the bit rate of the signal to be processed. However, the present invention is not limited to this. When the operation speed of the switch 21 is at least 100 times the bit rate of the signal to be processed, the above-described effect can be obtained.

For the embodiments described with reference to FIGS. 4 to 9B, various changes and modifications can be made by, e.g., using active elements for the jitter reducing circuits 61 to 6Y or 421 to 42Y.

Figure 10:
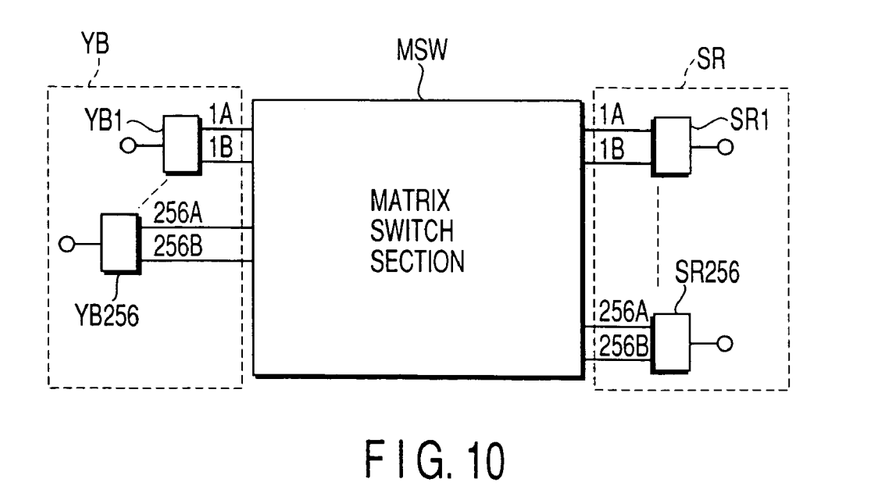
FIG. 10 is a block diagram showing a signal switching apparatus according to still another embodiment of the present invention.

FIG. 10 is a block diagram showing a signal switching apparatus according to still another embodiment of the present invention. This switching apparatus has, as main sections, a matrix switch section MSW, distributor YB, and a selector SR, which correspond to a matrix switch section 16, part of a receiving section 17, and part of a transmitting section 18 of the system shown in FIG. 1, respectively. However, the receiving section 17 and transmitting section 18 are not limited to sections for performing photoelectric conversion. Sections for simply receiving and transmitting an electrical signal may be used.

The distributor YB comprises 256 distributors (YB1 to YB256) which distribute digital signals of 256 (Li: L1 is a natural number) channels to an operation group 1A to 256A and an bypass group 1B to 256B in units of a channel. The distributed digital signals 1A to 256A of the operation group and the digital signals 1B to 256B of the bypass group are input to the switches of the matrix switch section MSW, such that the signals of the operation and bypass groups of each channel are input to different switches. This matrix switch section MSW is formed by indirectly coupling a plurality of switches. The digital signals 1A to 256A of the operation group and the digital signals 1B to 256B of the bypass group, which are output from different switches of the matrix switch section MSW, are input to the selector SR having 256 (Lo: Lo is a natural number) selectors (SR1 to SR256) corresponding to the respective channels. One of the signals of the operation group and bypass group is selectively output. The bypass group is used as bypasses when a failure occurs.

Figure 11:
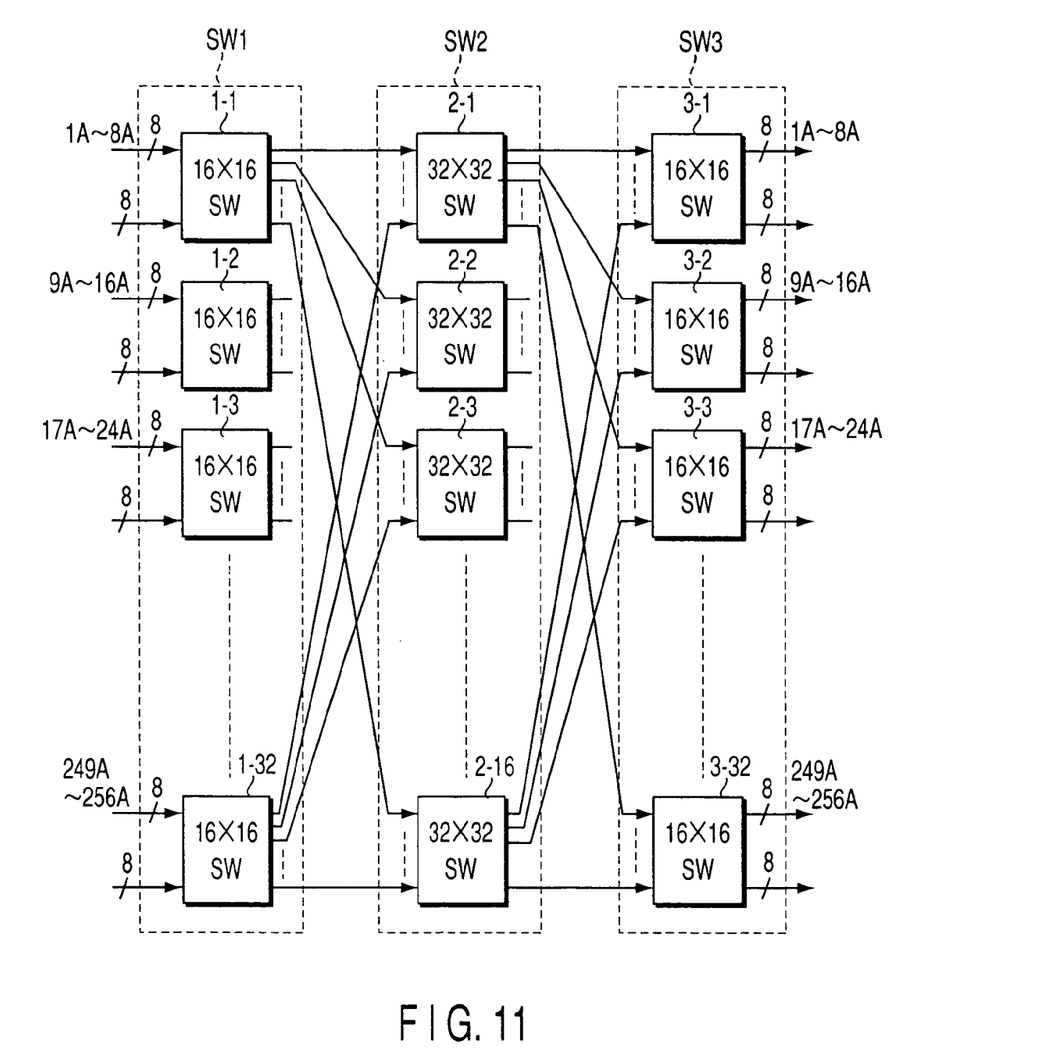
FIG. 11 is a circuit block diagram showing a matrix switch section in the apparatus shown in FIG. 10.

FIG. 11 is a circuit block diagram showing the matrix switch section MSW. The matrix switch section MSW has a three-stage structure comprising an input stage SW1, middle stage SW2, and output stage SW3. The input stage SW1 has 32 switches (1—1 to 1-32) of the 16×16 (the maximum number of inputs is 16 (N: N is a natural number), the maximum number of outputs is 16 (M: M is a natural number) type (16×16 SW), which are arranged in parallel. The total numbers of inputs and outputs are at least 512. The output stage SW3 also has 32 switches (3-1 to 3-32) of the 16×16 type, which are arranged in parallel. The total numbers of inputs and outputs are at least 512.

The middle stage SW2 between the input stage SW1 and the output stage SW3 has 16 switches (2-1 to 2-16) of the 32×32 type (32×32 SW) each having 32 inputs equal in number to the switches of the input stage SW1 and 32 outputs equal in number to the switches of the output stage SW3, which are arranged in parallel. A 16×16 type switch selectively exchanges digital signals of 16 lines with digital signals of 16 lines. A 32×32 type switch selectively exchanges digital signals of 32 lines with digital signals of 32 lines. The number of switches of the middle stage SW2 is P+Q (P and Q are natural numbers). The number of inputs for one group of one switch of the input stage SW1 is P (P is a natural number). The number of outputs for one group of one switch of the output stage SW3 is Q (Q is a natural number).

In the input stage SW1, operation group digital signals of eight channels are input to eight (N/2) lines of, e.g., one switch 1—1, and bypass group digital signals of eight channels which are different from those of the operation group are input to the eight (N/2) remaining lines of the switch 1—1. In the input stage SW1, the 16 output lines of one switch 1—1 are connected to the input lines of the switches 2-1 to 2-16 of the middle stage SW2, respectively. This also applied to the remaining switches 1-2 to 1-32 of the input stage SW1.

In the output stage SW3, the switches 2-1 to 2-16 of the middle stage SW2 are connected to the 16 input lines of one switch 3-1, respectively. This also applies to the remaining switches 3-2 to 3-32 of the output stage SW3.

The number of switches of each of the input stage SW1 and the output stage SW3 depends on the number of digital signals distributed by the distributors (YB1 to YB256) YB and the maximum numbers of inputs and outputs of one switch, and is therefore 32=(2×256/16).

The operation of the matrix switch section MSW shown in FIG. 11 in the normal mode will be described next.

Digital signals of eight channels are input to each of the switches 1—1 to 1-32 of the input stage SW1. Digital signals of eight channels are output from each of the switches 3-1 to 3-32 of the output stage SW3. When the number of inputs of one switch 1—1 of the input stage SW1 is eight, and the number of outputs of one switch 3-1 of the output stage SW3 is eight, the middle stage SW2 can construct 15 (8+8−1) non-blocking switches 2-1 to 2-15. The switch 2-16 of the middle stage SW2 operates as a spare switch for providing a bypass.

As a whole, the matrix switch section MSW has an indirectly coupled structure, as shown in FIG. 11. The connection pattern between the bypass group output lines (1B to 256B) of the distributors (YB1 to YB256) YB and the switches 1—1 to 1-32 of the input stage SW1, and the connection pattern between the switches 3-1 to 3-32 of the output stage SW3 and the selectors (SR1 to SR256) SR are merely examples. Another pattern may be used.

The operation of the above arrangement in case of a failure will be described next. Only a single failure will be examined.

When, e.g., the switch 1-3 of the input stage SW1 fails, eight inputs of each of the remaining normal switches 1—1, 1-2, and 1-4 to 1-32 must provide bypasses for one signal in addition to the eight original inputs of the operation group. In this case, the number of inputs of one switch of the input stage SW1 is nine, and the number of outputs of one switch of the output stage SW3 is eight. The middle stage SW2 need have 16 (9+8−1) switches. Hence, non-blocking switches are formed as a whole.

According to the matrix switch section MSW shown in FIG. 11, the digital signals of 256 channels are distributed to the operation group and bypass group using the 2-output distributors (YB1 to YB256) YB in units of a channel and input to the matrix switch section MSW. In the matrix switch section MSW, the number of switches to be parallelly arranged in each of the input stage SW1 and output stage SW3 is determined on the basis of the number of distributed digital signals and the maximum numbers of inputs and outputs of the switches to be used. For the middle stage SW2, the type of switches to be used can be selected on the basis of the total numbers of switches of the input stage SW1 and output stage SW3. The number of non-blocking switches is determined on the basis of the numbers of inputs and outputs of one switch of each of the input stage SW1 and output stage SW3. The plurality of non-blocking switches and one bypass switch are arranged in parallel.

The operation group digital signals of 256 channels and bypass group digital signals of 256 channels, which are distributed by the distributors (YB1 to YB256) YB, are input to the switches 1—1 to 1-32 of the input stage SW1, such that the signals of the operation and bypass groups of each channel are input to different switches. These digital signals pass through the middle stage SW2 and are output from the switches 3-1 to 3-32 of the output stage SW3, such that the signals of the operation and bypass groups of each channel are output from different switches. After this, the operation group digital signals and bypass group digital signals are input to the corresponding selectors (SR1 to SR256) SR in units of a channel. One of the two groups is selectively output.

The matrix switch section MSW is designed to have a minimum circuit scale on the basis of the number of digital signals to be distributed and the type of switches to be used in each of the input stage SW1 and output stage SW3, and the number of switches can be minimized. In this embodiment, 16×16 type switches are used.

The circuit scale of a 16×16 type switch is about ¼ that of a 32×32 type switch. The matrix switch section MSW has a circuit scale corresponding to 32 switches of the 32×32 type, which is ½ or less the conventional scale corresponding to 72 switches. The distributors and selectors can also be 2:1. When a large apparatus is to be formed, the circuit scale can be much smaller, and a reliable apparatus with low power consumption can be realized. The operation group digital signals and bypass group digital signals are input to different switches of the matrix switch section MSW, respectively and output from different switches, respectively, such that the signals of the operation and bypass groups of each channel are input and output to and form different switches. For this reason, when the digital signal of a certain channel has an error or a switch fails, a bypass can be immediately provided, resulting in an increase in reliability.

In the matrix switch section MSW shown in FIG. 11, for one switch of the input stage SW1, operation group digital signals are input to eight lines of the 16 inputs at maximum, and bypass group digital signals of channels different from those of the operation group are input to the eight remaining lines. With this arrangement, one switch of the input stage SW1 can be shared by the operation group and bypass group. In addition, channel omission in case of a switch failure can be prevented. Since switches need not be dedicated to each of the operation group and bypass group, the number of switches can be decreased.

In the matrix switch section MSW, the plurality of output lines (16 lines) of one switch of the input stage SW1 are connected to the input lines of different switches of the middle stage SW2, respectively. In addition, the output lines of the different switches 2-1 to 2-16 of the middle stage SW2 are connected to the input lines (16 lines) of one switch of the output stage SW3, respectively. When operation group digital signals are input to eight lines of one switch of the input stage SW1, and bypass group digital signals are input to the eight remaining lines, a path for the operation group and a path for the bypass group can be independently formed in the middle stage SW2.

Figure 12:
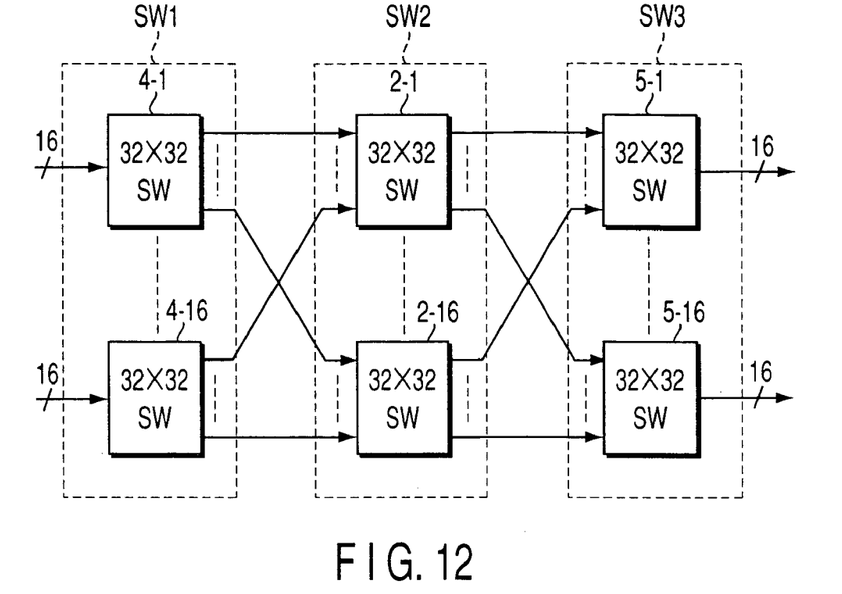
FIG. 12 is a circuit block diagram showing a matrix switch section according to still another embodiment of the present invention.

FIG. 12 is a circuit block diagram showing a matrix switch section according to still another embodiment of the present invention. The same reference numerals as in FIG. 11 denote the same parts in FIG. 12, and a detailed description thereof will be omitted. Only operation group signals are illustrated, and bypass group signals are omitted. The arrangement of the bypass group is the same as in FIG. 11.

In the matrix switch section shown in FIG. 12, an input stage SW1 is formed by parallelly arranging 16 switch modules 4-1 to 4-16 of the 32×32 type (32×32 SW). An output stage SW3 is formed by parallelly arranging 16 switch modules 5-1 to 5-16 of the 32×32 type.

As the basic concept of formation of the switch modules 4-1 to 4-16 and 5-1 to 5-16, the maximum numbers of inputs and outputs of one switch of each of the input stage SW1 and output stage SW3 are made equal to those of one switch of the middle stage SW2. On the basis of this concept, a plurality of switches of the input stage SW1 are combined to form one switch module. A plurality of switches of the output stage SW3 are combined to form one switch module.

Figure 13:
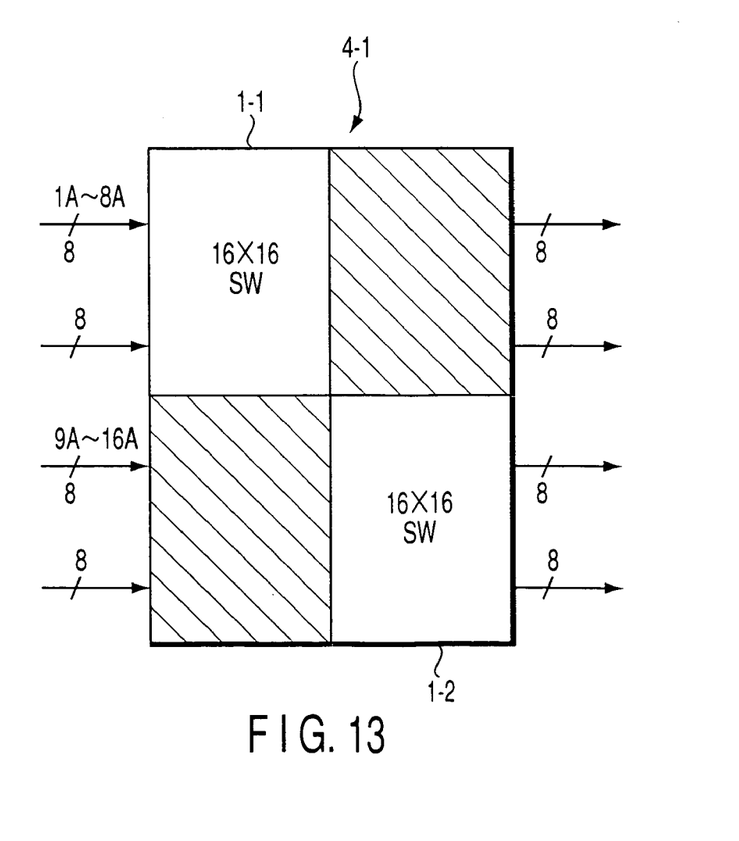
FIG. 13 is a view showing a switch module used in the matrix switch section shown in FIG. 12.

More specifically, as shown in FIG. 13, each of the switch modules 4-1 to 4-16 and 5-1 to 5-16 is formed by combining two 16×16 type switches described in the embodiment shown in FIG. 11. In this case, since all switches of the matrix switch section can be formed using 32×32 type switches, a matrix switch section MSW can be formed on one chip. This can contribute to further size and cost reduction of the apparatus.

In the embodiments described with reference to FIGS. 10 to 13, the three-stage structure comprising the input stage SW1, middle stage SW2, and output stage SW3 is employed. However, three or more stages can be used as far as the number of stages is odd. For the type of switches, the types of distributors and selectors, the connection structure of the matrix switch section, and the type of digital signals to be processed as well, various changes and modifications can be made.

According to the embodiments described with reference to FIGS. 10 to 13, in a large matrix switch section, the number of switches can be decreased, and the circuit scales of distributors and selectors can be reduced. Hence, a compact and reliable signal switching apparatus with a low power consumption can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A serial transmission path switching system comprising:
    a switch section having a plurality of input lines and a plurality of output lines to perform line-switching between the input lines and output lines;
    a plurality of first serial transmission paths connected to the input lines, respectively;
    input buffers connected to input-side communication devices and terminals of the first serial transmission paths, respectively, to equalize transmission signals from said input-side communication devices and send the signals to the first serial transmission paths;
    a plurality of second serial transmission paths connected to the output lines, respectively;
    output buffers connected to output-side communication devices and terminals of the second serial transmission paths, respectively, to equalize transmission signals from the second serial transmission paths and send the signals to said output-side communication devices;
    a receiving section inserted between the first serial transmission paths and the input lines to receive the transmission signals from the first serial transmission paths and supply the signals to the input lines; and
    a transmitting section inserted between the output lines and the second serial transmission paths to receive the transmission signals from the output lines and supply the signals to the second serial transmission paths, wherein said receiving section and said transmitting section comprise an optical receiving section and an optical transmitting section, respectively, and transmission paths of the first and second serial transmission paths, connected to said optical receiving section and said optical transmitting section, comprise optical fiber cables.

2. The system according to claim 1, wherein buffers of said input and output buffers, connected to said optical fiber cables, have a function of converting an optical signal into an electrical signal or vice versa.

3. A serial transmission path switching system comprising:
- a switch section having a plurality of input lines and a plurality of output lines to perform line-switching between the input lines and output lines;
- a plurality of first serial transmission paths connected to the input lines, respectively;
- input buffers connected to input-side communication devices and terminals of the first serial transmission paths, respectively, to equalize transmission signals from said input-side communication devices and send the signals to the first serial transmission paths;
- a plurality of second serial transmission paths connected to the output lines, respectively; and
- output buffers connected to output-side communication devices and terminals of the second serial transmission paths, respectively, to equalize transmission signals from the second serial transmission paths and send the signals to said output-side communication devices, wherein said switch section comprises:
- a switch having a plurality of input portions and a plurality of output portions to perform line-switching between said input portions and output portions,
- frequency band expanding members connected to said output portions, respectively, to increase a gain of high-frequency-side frequency characteristics of each of transmission signal from said output portions, and
- buffer amplifiers connected to said frequency band expanding members to buffer the transmission signals from said frequency band expanding members and send the signals to the output lines, respectively.

4. The system according to claim 3, wherein said frequency band expanding member comprises a high-pass filter.

5. The system according to claim 4, wherein said high-pass filter comprises a resister and a capacitor which are connected in parallel.

6. A serial transmission path switching system comprising:
- a switch section having a plurality of input lines and a plurality of output lines to perform line-switching between the input lines and output lines;
- a plurality of first serial transmission paths connected to the input lines, respectively;
- input buffers connected to input-side communication devices and terminals of the first serial transmission paths, respectively, to equalize transmission signals from said input-side communication devices and send the signals to the first serial transmission paths;
- a plurality of second serial transmission paths connected to the output lines, respectively; and
- output buffers connected to output-side communication devices and terminals of the second serial transmission paths, respectively, to equalize transmission signals from the second serial transmission paths and send the signals to said output-side communication devices, wherein said switch section comprises:
- a switch having a plurality of input portions and a plurality of output portions to perform line-switching between said input portions and output portions,
- conversion members connected to said output portions to convert transmission signals from said output portions into pairs of positive and negative differential signals, respectively,
- pairs of frequency band expanding members connected to said conversion members, respectively, to increase a gain of high-frequency-side frequency characteristics of each of the positive and negative differential signals from said conversion members, and
- buffer amplifiers connected to said pairs of frequency band expanding members to combine the transmission signals from the pairs of frequency band expanding members into single signals, buffer the single signals and send the signals to the output lines, respectively.

7. The system according to claim 6, wherein said frequency band expanding member comprises a high-pass filter.

8. The system according to claim 7, wherein said high-pass filter comprises a resister and a capacitor which are connected in parallel.

9. A serial transmission path switching system comprising:
- a switch section having a plurality of input lines and a plurality of output lines to perform line-switching between the input lines and output lines;
- a plurality of first serial transmission paths connected to the input lines, respectively;
- input buffers connected to input-side communication devices and terminals of the first serial transmission paths, respectively, to equalize transmission signals from said input-side communication devices and send the signals to the first serial transmission paths;
- a plurality of second serial transmission paths connected to the output lines, respectively; and
- output buffers connected to output-side communication devices and terminals of the second serial transmission paths, respectively, to equalize transmission signals from the second serial transmission paths and send the signals to said output-side communication devices, wherein said switch section comprises:
- a switch having a plurality of input portions and a plurality of output portions to perform line-switching between said input portions and output portions, and
- buffer amplifiers connected to said output portions to buffer transmission signals from said output portions and send the signals to the output lines, respectively, and wherein an operation speed of said switch is set to be not less than 100 times a bit rate of a digital signal to be input to said input portion.

10. A serial transmission path switching system comprising:
- a switch section having a plurality of input lines and a plurality of output lines to perform line-switching between the input lines and output lines;
- a plurality of first serial transmission paths connected to the input lines, respectively;
- input buffers connected to input-side communication devices and terminals of the first serial transmission paths, respectively, to equalize transmission signals from said input-side communication devices and send the signals to the first serial transmission paths;

a plurality of second serial transmission paths connected to the output lines, respectively;

output buffers connected to output-side communication devices and terminals of the second serial transmission paths, respectively, to equalize transmission signals from the second serial transmission paths and send the signals to said output-side communication devices;

a receiving section inserted between the first serial transmission paths and the input lines to receive the transmission signals from the first serial transmission paths and supply the signals to the input lines; and a transmitting section inserted between the output lines and the second serial transmission paths to receive the transmission signals from the output lines and supply the signals to the second serial transmission paths, wherein (a) said receiving section has Li (Li is a natural number) distributors for distributing digital signals of Li channels to a first group and a second group in units of a channel, (b) said switch section comprises:

an input stage formed by parallelly arranging a plurality of switches and having a total of at least 2Li (Li is a natural number) inputs, each switch having a maximum number N (N is a natural number) of inputs and a maximum number M (M is a natural number) of outputs, an output stage formed by parallelly arranging a plurality of switches and having a total of at least 2Lo (Lo is a natural number) outputs, each switch having the maximum number N of inputs and the maximum number M of outputs, and a middle stage inserted between said input stage and said output stage and formed by parallelly arranging (P+Q) where P (P is a natural number) is the number of inputs of one switch of said input stage for one of said groups, and Q (Q is a natural number) is the number of outputs of one switch of said output stage for one of said groups switches having inputs equal in number to the total number of outputs of said switches of said input stage and outputs equal in number to the total number of inputs of said switches of said output stage, wherein the digital signals of said first and second groups of each of the Li channels, which are distributed by said receiving section, are input to switches of said input stage different from each other between said groups, passed through said plurality of switches of said middle stage, and output from switches of said output stage different form each other between said groups, and (c) said transmitting section has Lo selectors such that the digital signals of said first and second groups, which are output from switches of said switch section different from each other between said groups, are input to corresponding selectors, and the digital signal of one of said groups is selectively output.

11. The system according to claim 10, wherein the number of switches of said input stage is (2Li/N), and the number of switches of said output stage is (2Lo/M).

12. The system according to claim 10, wherein the digital signals of said first group are input to N/2 lines of one switch of said input stage, and the digital signals of said second group of channels different from those of said first group are input to N/2 remaining lines.

13. The system according to claim 10, wherein a plurality of output lines of one switch of said input stage are connected to input lines of different switches of said middle stage, respectively, and a plurality of input lines of one switch of said output stage are connected to output lines of different switches of said middle stage, respectively.

14. The system according to claim 10, wherein a plurality of switches of said input stage are combined to form one switch module, and a plurality of switches of said output stage are combined to form one switch module such that the maximum number of inputs and the maximum number of outputs of one switch of each of said input stage and said output stage equals the maximum number of inputs and the maximum number of outputs of one switch of said middle stage.

15. The system according to claim 3, further comprising:

a receiving section inserted between the first serial transmission paths and the input lines to receive the transmission signals from the first serial transmission paths and supply the signals to the input lines.

16. The system according to claim 15, further comprising:

a transmitting section inserted between the output lines and the second serial transmission paths to receive the transmission signals from the output lines and supply the signals to the second serial transmission paths.

17. The system according to claim 16, wherein said receiving section and said transmitting section comprise an optical receiving section and an optical transmitting section, respectively, and transmission paths of the first and second serial transmission paths, connected to said optical receiving section and said optical transmitting section, comprise optical fiber cables.

18. The system according to claim 17, wherein buffers of said input and output buffers, connected to said optical fiber cables, have a function of converting an optical signal into an electrical signal or vice versa.

19. The system according to claim 3, wherein said input buffers comprise a buffer designed to be compatible with different transfer rates, and said output buffers comprise a buffer designed to be compatible with different transfer rates.

20. The system according to claim 3, wherein said input and output buffers comprise a buffer designed to be compatible with a plurality of transfer rates and having a function of selectively setting a transmission rate in accordance with a connected communication device.

21. The system according to claim 3, wherein said switch section comprises a matrix switch section having a plurality of switch arrayed in a matrix format.

* * * * *